US011612104B2

(12) United States Patent
Canty et al.

(10) Patent No.: US 11,612,104 B2
(45) Date of Patent: Mar. 28, 2023

(54) POWER LIFT RAKE AND METHODS OF USE THEREOF

(71) Applicants: William Canty, Cartersville, GA (US); Felecia Canty, Cartersville, GA (US)

(72) Inventors: William Canty, Cartersville, GA (US); Felecia Canty, Cartersville, GA (US)

( * ) Notice: Subject to any disclaimer, the term of this patent is extended or adjusted under 35 U.S.C. 154(b) by 623 days.

(21) Appl. No.: 16/836,518

(22) Filed: Mar. 31, 2020

(65) Prior Publication Data

US 2020/0315093 A1   Oct. 8, 2020

Related U.S. Application Data

(60) Provisional application No. 62/830,540, filed on Apr. 7, 2019.

(51) Int. Cl.
*A01D 43/07* (2006.01)
*A01D 43/02* (2006.01)

(52) U.S. Cl.
CPC ............. *A01D 43/07* (2013.01); *A01D 43/02* (2013.01)

(58) Field of Classification Search
CPC ........ A01D 76/006; A01D 11/06; A01D 7/04; A01D 78/006; A01D 57/12; A01D 57/14; A01D 43/07; A01D 43/02
See application file for complete search history.

(56) References Cited

U.S. PATENT DOCUMENTS

| | | | | | |
|---|---|---|---|---|---|
| 2,436,475 | A | * | 2/1948 | Jones | A01D 78/002 56/DIG. 11 |
| 3,030,760 | A | * | 4/1962 | Weaver | A01D 78/04 56/377 |
| 3,073,102 | A | * | 1/1963 | Haverkamp | A01D 78/04 56/11.9 |
| 3,367,093 | A | * | 2/1968 | Zwickel | A01D 43/02 200/5 R |
| 3,385,041 | A | * | 5/1968 | Douglas | A01D 43/02 56/255 |
| 3,546,869 | A | * | 12/1970 | Weaver | A01D 78/04 56/377 |
| 3,765,159 | A | * | 10/1973 | Neff | A01B 45/00 56/396 |
| 4,166,353 | A | * | 9/1979 | Garrison | A01D 78/04 56/377 |
| 4,472,930 | A | * | 9/1984 | Smith | A01B 45/00 56/396 |

(Continued)

*Primary Examiner* — Abigail A Risic
(74) *Attorney, Agent, or Firm* — Mathew L. Grell; Grell & Watson Patent Attorneys LLC

(57) ABSTRACT

A wheeled trailer to be moved across a lawn having integral structural frame and wheels for carrying said frame, a screen removeably affixed to an interior of the frame, a retractable deck with a plurality of tines extending from an underside of the deck, the tines configured to engage a ground surface, a lift assembly affixed to the frame to raise and lower/dynamically move the plurality of tines extending from an underside of the deck therethrough the screen, and a power system mounted on the frame with control to power the lift assembly, and, thus, functions to provide for automated collection and removal of yard debris such as leaves, pine straw, and other decomposing debris collected on the tines while raking and dethatching especially if the debris contains pine needles and depositing the debris where the operator chooses.

20 Claims, 9 Drawing Sheets

(56) References Cited

U.S. PATENT DOCUMENTS

| | | | | |
|---|---|---|---|---|
| 4,510,742 A | * | 4/1985 | Lypka | A01D 76/006 |
| | | | | 460/24 |
| 5,127,217 A | * | 7/1992 | Fell | A01D 78/001 |
| | | | | 56/364 |
| 8,657,026 B2 | * | 2/2014 | Friesen | A01B 63/32 |
| | | | | 172/452 |
| 9,839,176 B1 | * | 12/2017 | Snyder | A01B 35/24 |
| 2003/0046917 A1 | * | 3/2003 | Meier | A01D 78/04 |
| | | | | 56/376 |
| 2021/0137012 A1 | * | 5/2021 | Mortaro | A01D 80/00 |
| 2021/0386015 A1 | * | 12/2021 | Baum | A01D 43/073 |

* cited by examiner

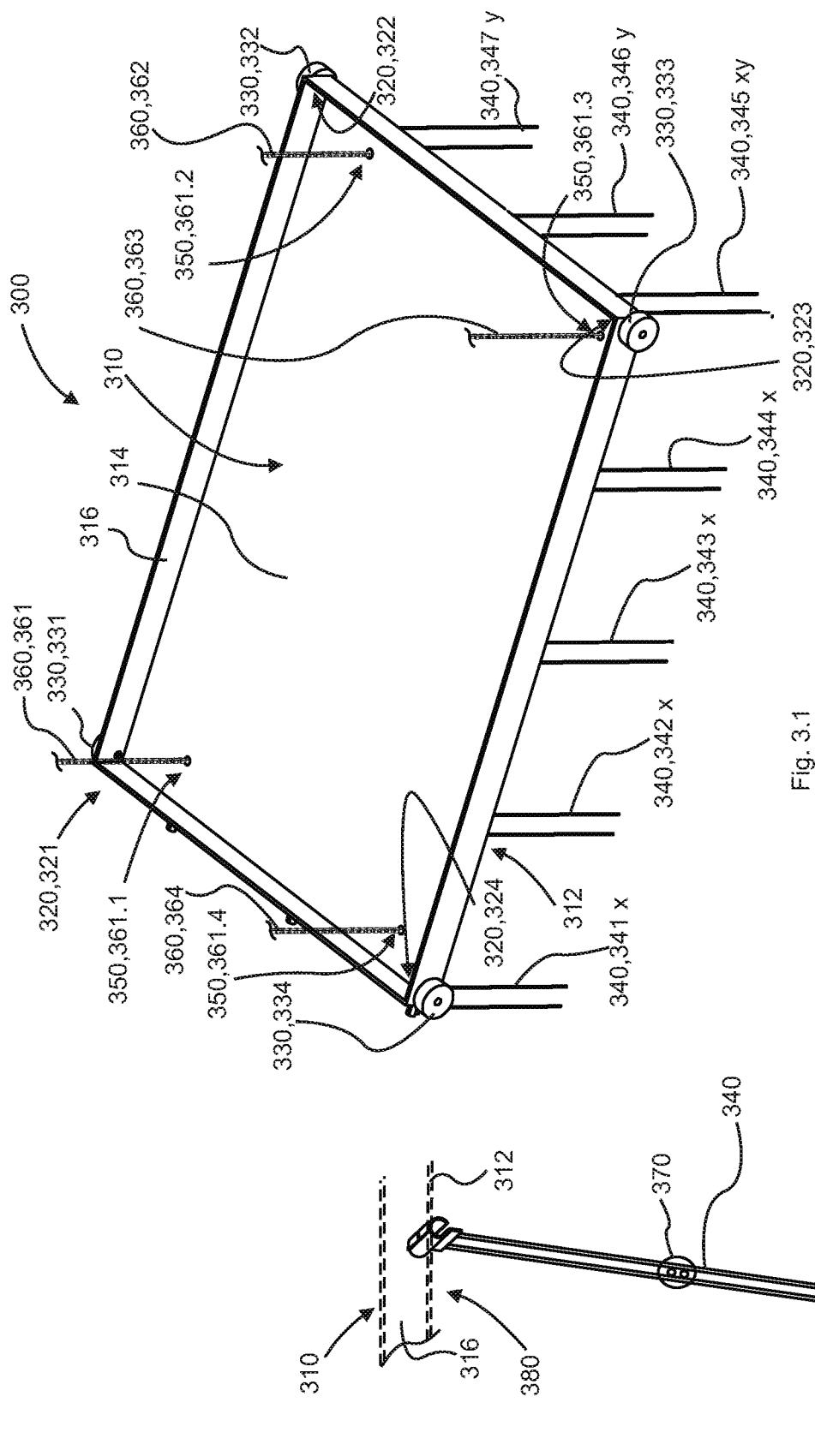

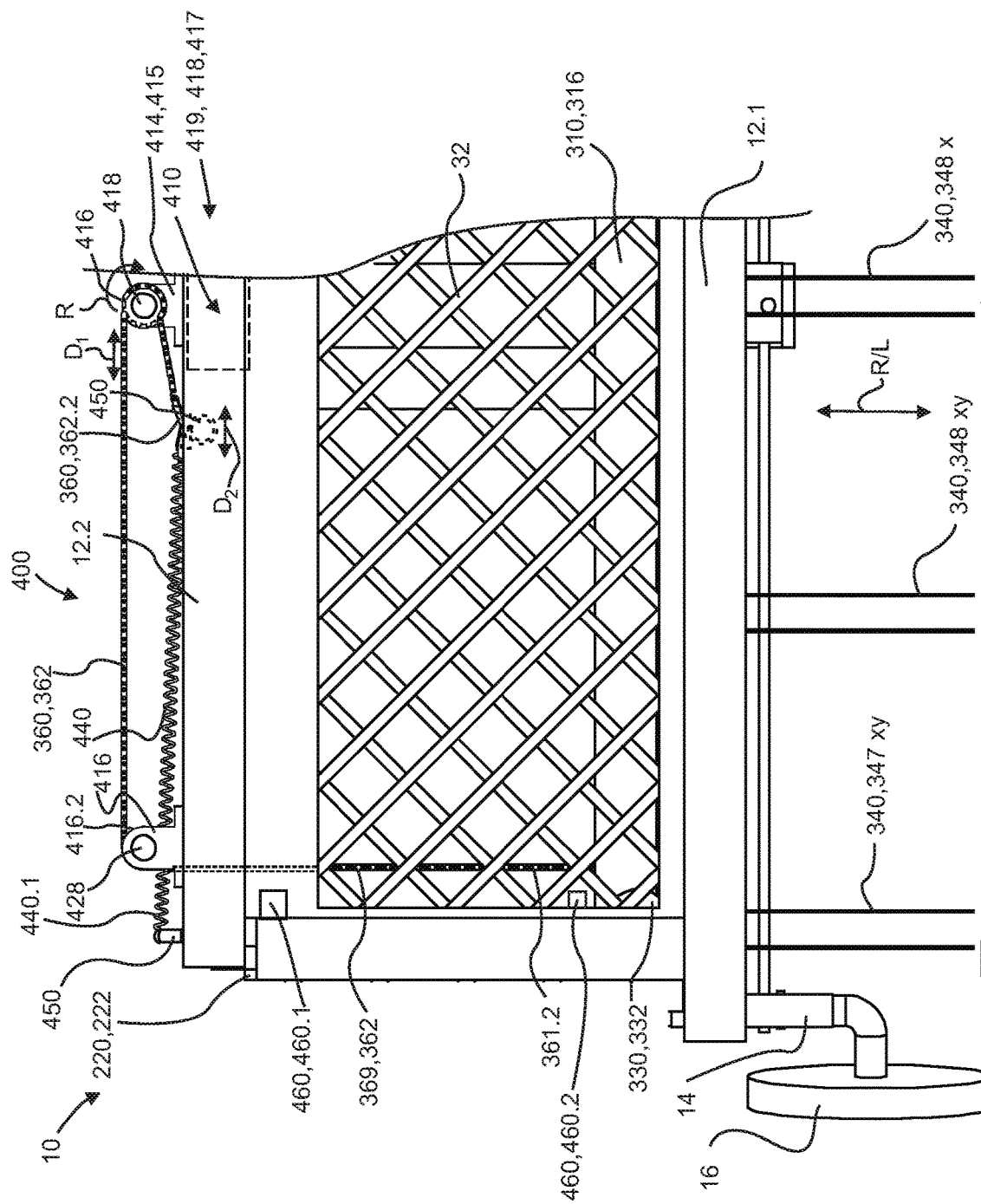
Fig. 4.1

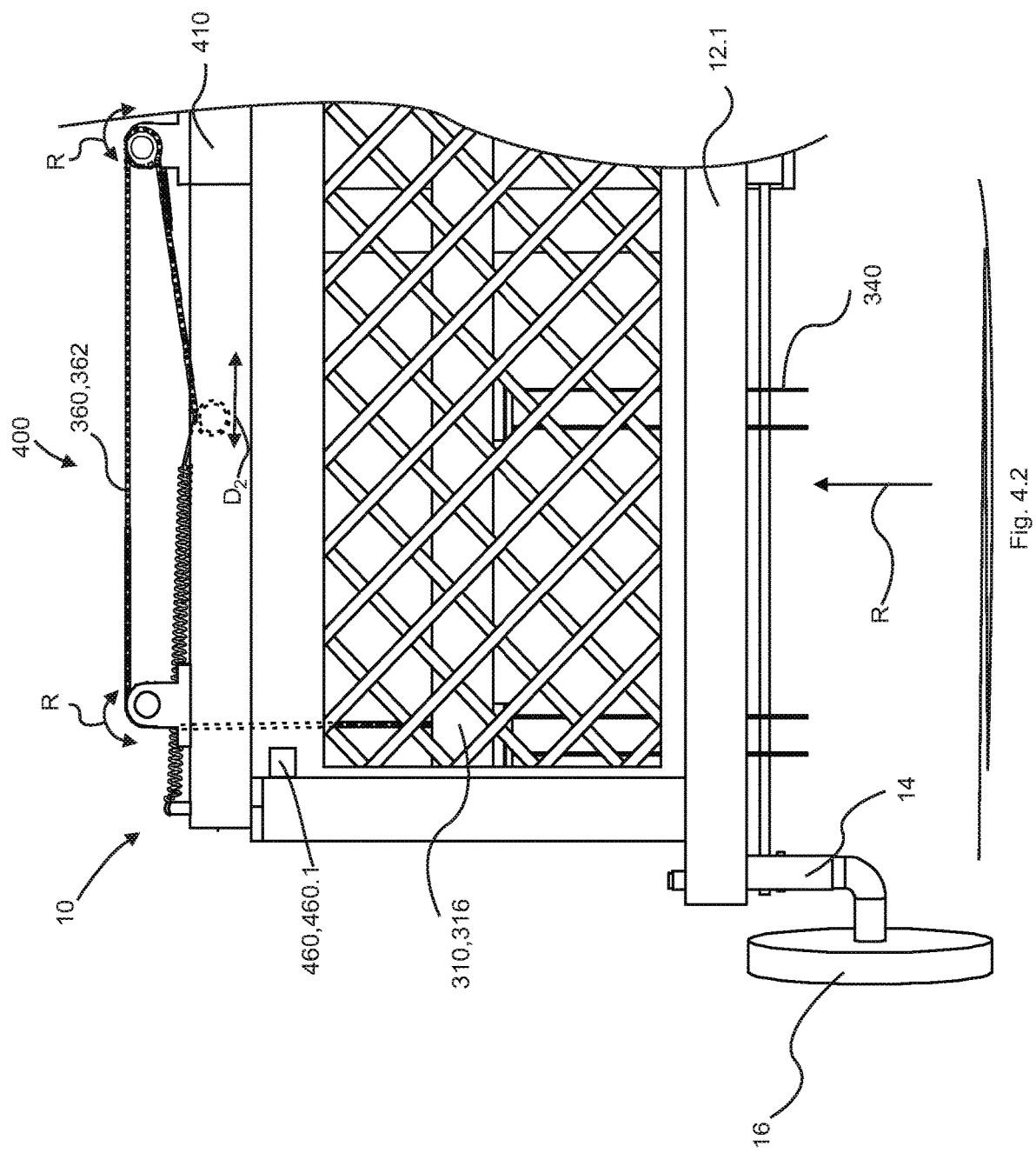

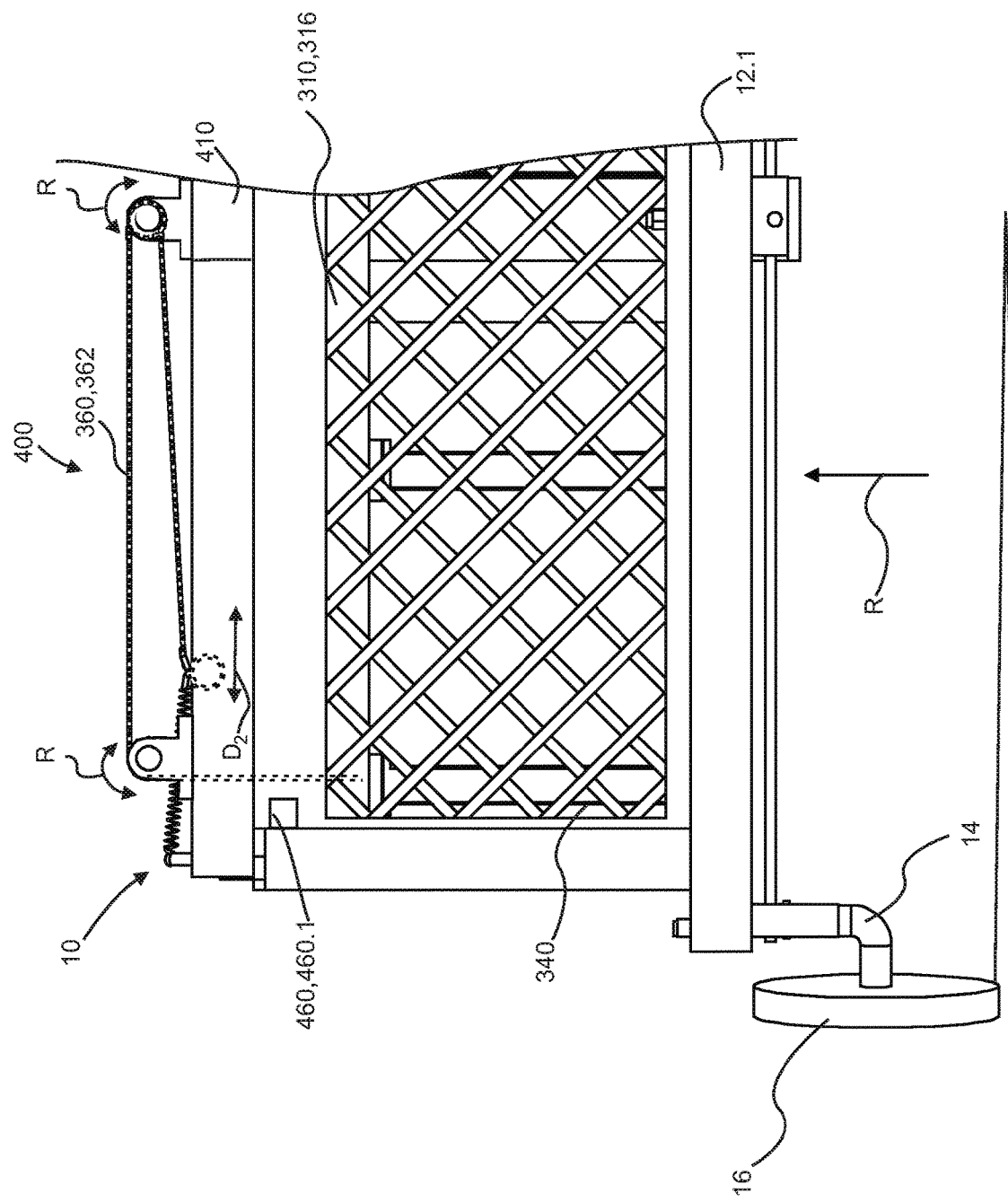
Fig. 4.3

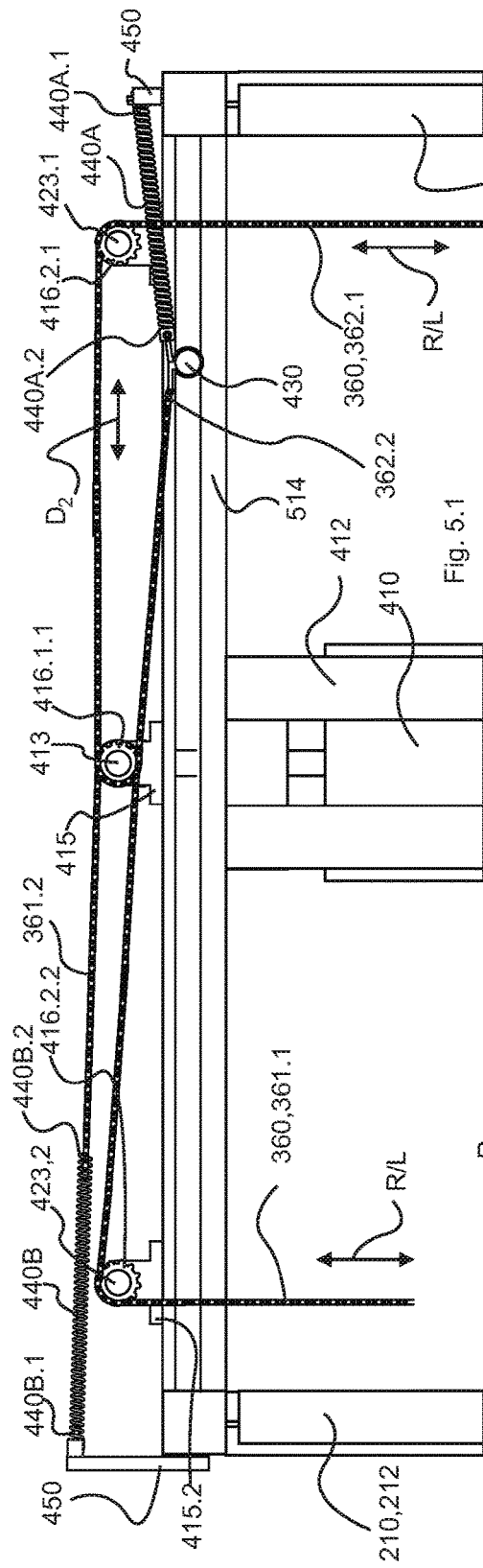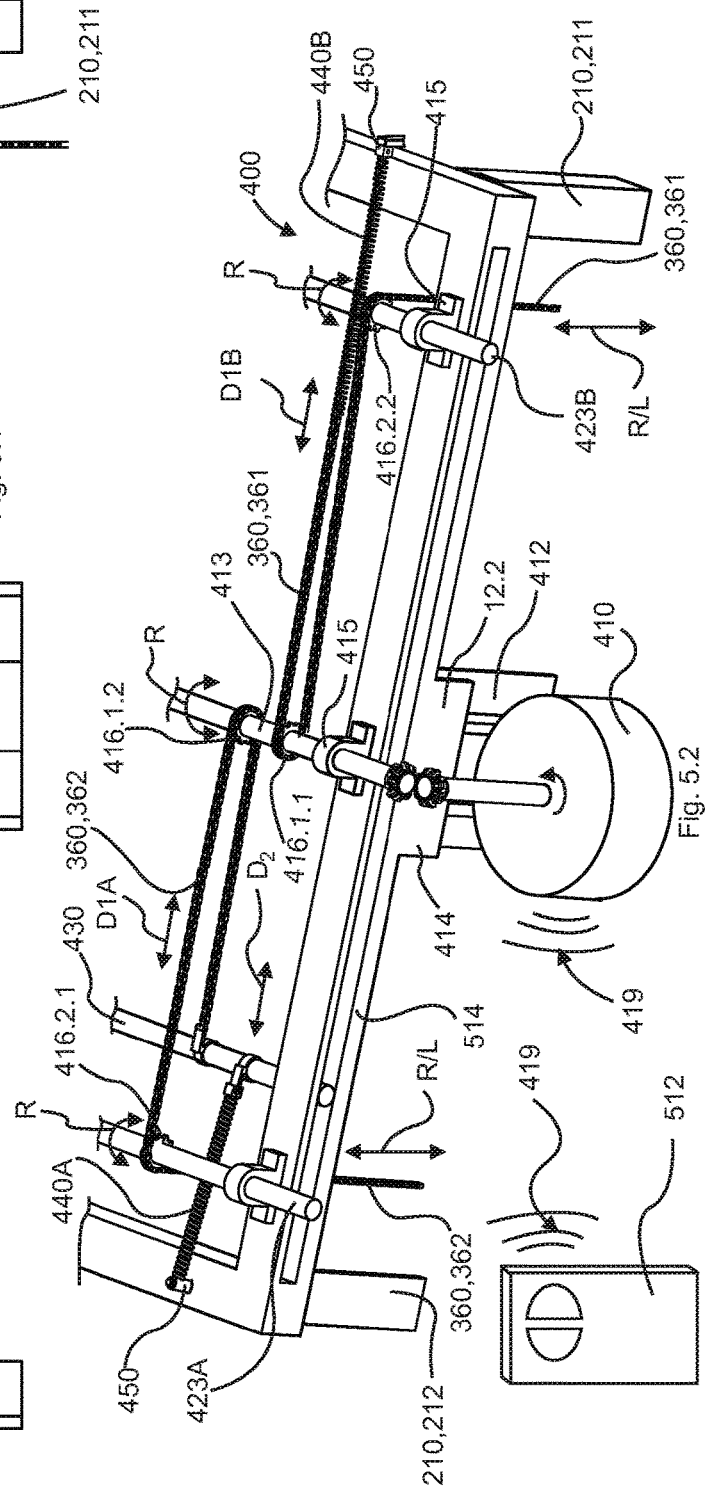

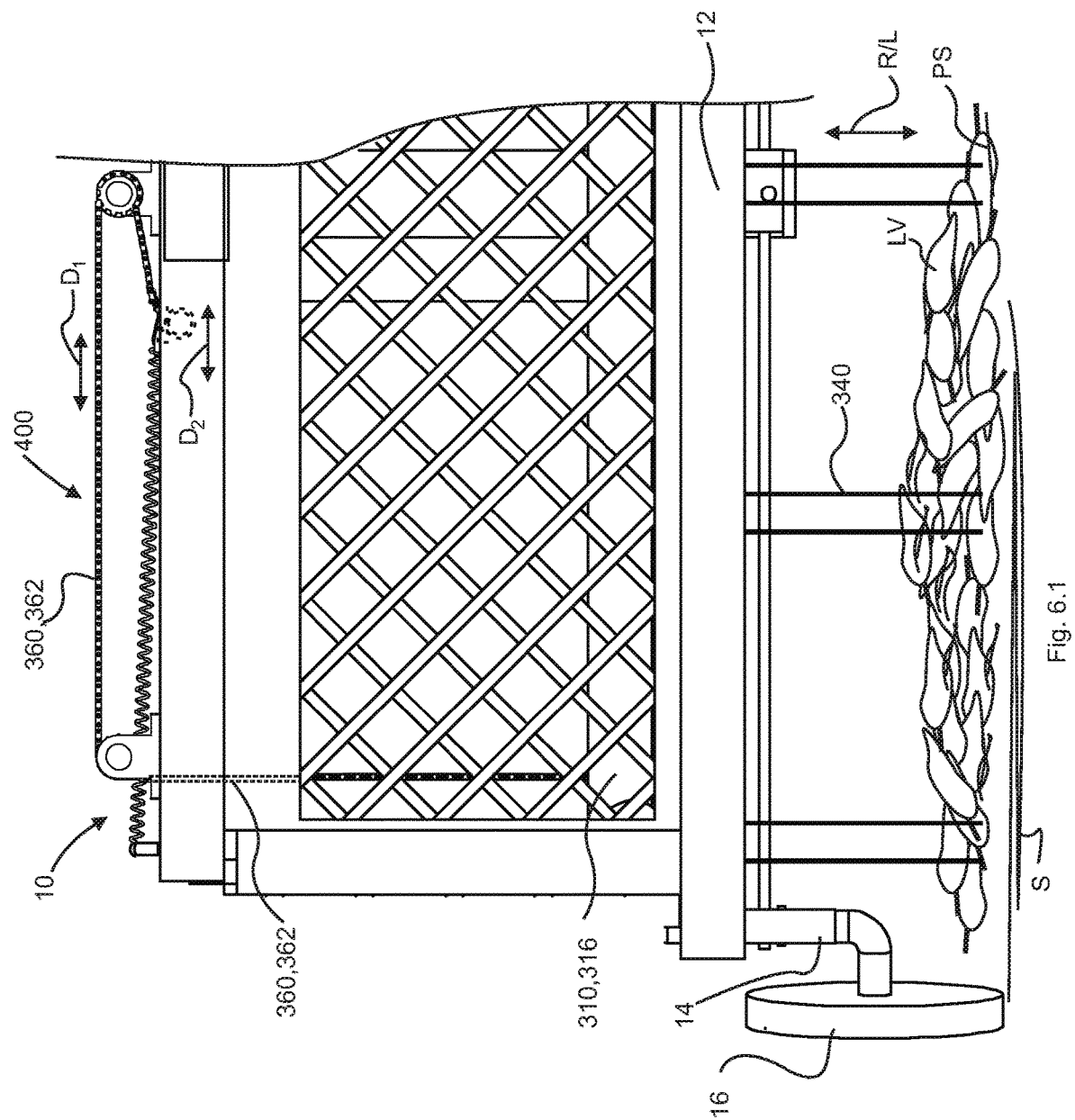
Fig. 6.1

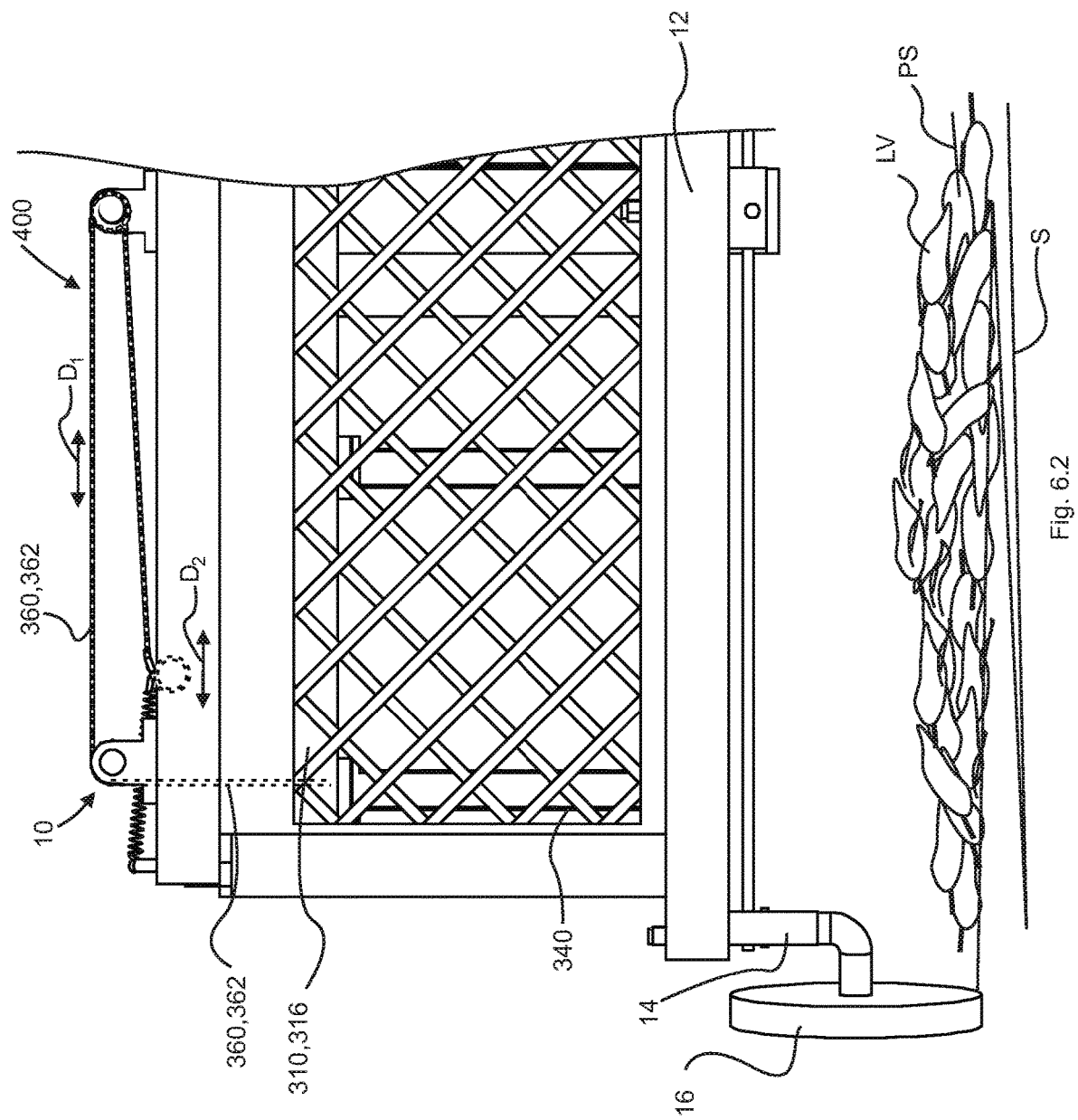
Fig. 6.2 ures. POWER LIFT RAKE AND METHODS OF
USE THEREOF

CROSS-REFERENCE TO RELATED
APPLICATIONS

To the full extent permitted by law, the present United States Non-provisional Patent Application hereby claims priority to and the full benefit of, U.S. Provisional Application No. 62/830,540, filed on Apr. 7, 2019, entitled "Remote Power Lift Drag Behind Wheeled Rake and Methods of Use", which is incorporated by reference herein in its entirety.

FIELD OF THE DISCLOSURE

The present disclosure is directed to a pull behind rake and methods of use thereof. More specifically, the present disclosure is directed to a wheeled trailer with a liftable rake deck with a plurality of tines.

BACKGROUND

Various approaches have been utilized to rake and dethatch a lawn to assist with new growth of grass, root development, as well as removal of debris such as leaves, pine straw, and other decomposing debris from a lawn. This increases the amount of sunlight, water and nutrients your lawn can consume which allows your grass to grow fuller and thicker. It also decreases the number and count of insect that live in thatch. For example, one such previous approach includes hand tools, such as a rake or other dethatching hand tool but these tools are labor intensive. Another such previous primary approach includes a dethatcher consisting of a platform with a plurality of tines attached thereto where said platform is connected to a motorized vehicle and is able to be raised and lowered by a 3-point hitch or the like. One disadvantage or drawback to this approach is that, the tines collect debris and it is difficult to remove this debris especially if the debris contains pine needles. Another previous approach includes a rotational drum with a plurality of tines attached thereto under a cover where said drum is connected to a motorized vehicle or the like. One disadvantage or drawback to this approach of pushing a de-thatcher over the lawn is that the leaves and pine needles are left on the lawn and manual raking of the thatch is required in order to bag and remove same.

Therefore, it is readily apparent that there is a recognizable unmet need for a power lift rake and methods of use that may be configured to address at least some aspects of the problems discussed above common to yard and lawn care, which specifically functions to provide for automated collection and removal of debris such as leaves, pine straw, and other decomposing debris collected on the tines while raking and dethatching especially if the debris contains pine needles.

SUMMARY

Briefly described, in an example embodiment, the present disclosure may overcome the above-mentioned disadvantages and may meet the recognized need for power rake and methods of use, having primarily a wheeled trailer to be moved across a lawn having integral structural frame and wheels for carrying said frame, a screen removeably affixed to an interior of the frame, a retractable deck with a plurality of tines extending from an underside of the deck, the tines configured to engage a ground surface, a lift assembly affixed to the frame to raise and lower/dynamically move the plurality of tines extending from an underside of the deck therethrough the screen, and a power system mounted on the frame with control to power the lift assembly, and, thus, functions to provide for automated collection and removal of debris such as leaves, pine straw, and other decomposing debris collected on the tines while raking and dethatching especially if the debris contains pine needles and depositing the debris where the operator chooses.

Accordingly, in one aspect, the present disclosure the control may include remote control via wireless control wherein the operator may lower the retractable deck with a plurality of tines extending from an underside of the deck to rake yard debris where desired and raise the retractable deck with a plurality of tines extending from an underside of the deck therethrough the screen to deposit yard debris where desired.

Accordingly, in another aspect, the present disclosure may include a remote control raise and lower buttons, positioned with the operator, in wireless communication with the controller, wherein the operator may press a button to lower the retractable deck with a plurality of tines extending from an underside of the deck to rake yard debris where desired and press a button raise the retractable deck with a plurality of tines extending from an underside of the deck therethrough the screen to deposit yard debris where desired.

Accordingly, in another aspect, the present disclosure may include a power lift rake assembly to rake and deposit yard debris laying on the ground surface, including a retractable deck, a plurality of tines extending from an underside of the retractable deck, the tines configured to engage the yard debris on the ground surface, a trailer to be moved across the ground surface, the trailer having a structural frame and wheels, a separator screen removeably affixed to an interior of the frame, a lift assembly affixed to the frame configured to raise and lower the retractable deck within the frame, wherein the plurality of tines extending from the underside of the retractable deck move therethrough the separator screen, and a power system mounted to the frame, the power system configured to drive the lift assembly.

Accordingly, in another aspect, the present disclosure may include A power lift rake assembly to rake and deposit yard debris laying on the ground surface, including a retractable deck, a plurality of tines extending from an underside of the retractable deck, the tines configured to engage the yard debris on the ground surface, a structural frame to be moved across the ground surface, a screen removeably affixed to an interior of the frame, a lift assembly affixed to the frame configured to raise and lower the retractable deck within the frame, wherein the plurality of tines extending from the underside of the retractable deck move therethrough the screen.

Accordingly, in another aspect, the present disclosure may include mounting hardware to mount a wheel-less version of present disclosure thereto a motorized vehicle, such as a riding mower or tractor.

In an exemplary embodiment of the power lift rake assembly to rake and deposit yard debris laying on the ground surface, including a retractable deck, a plurality of tines extending from an underside of the retractable deck, the tines configured to engage the yard debris on the ground surface, a trailer to be moved across the ground surface, the trailer having a frame and wheels, a separator screen removeably affixed to an interior of the frame, a lift assembly affixed to the frame configured to raise and lower the retractable deck within the frame, wherein the plurality of tines extending from the underside of the retractable deck move therethrough the separator screen, and a power system mounted to the frame, the power system configured to drive the lift assembly.

In another exemplary embodiment of the A power lift rake assembly to rake and deposit yard debris laying on the ground surface, including a retractable deck, a plurality of tines extending from an underside of the retractable deck, the tines configured to engage the yard debris on the ground surface, a frame to be moved across the ground surface, a screen removeably affixed to an interior of the frame, a lift assembly affixed to the frame configured to raise and lower the retractable deck within the frame, wherein the plurality of tines extending from the underside of the retractable deck move therethrough the screen.

A feature of the present disclosure may include a lift assembly having one or more sprockets, chains, drive shafts, and springs to affixed to the frame to raise and lower/dynamically move the plurality of tines extending from an underside of the deck.

A feature of the present disclosure may include an electric motor assembly affixed to the frame to provide rotational movement for the lift assembly.

A feature of the present disclosure may include a lift assembly having hydraulics affixed to the frame and deck to raise and lower/dynamically move the plurality of tines extending from an underside of the deck.

A feature of the present disclosure may include a lift assembly height adjustable so the select height of the tines can be changed depending on the application.

A feature of the present disclosure may include a skid plate rather than wheels to support the frame and maintain the plurality of tines extending from an underside of the deck above the ground surface.

A feature of the present disclosure may include to provide an integrated system involving highly efficient raking, highly efficient transport of raked materials from the raking zone.

A feature of the present disclosure may include to provide improvements in lawn raking for thatch and like materials wherein the entire operation, process and apparatus is power operated.

A feature of the present disclosure may include to provide methods of and apparatus for lawn raking (for thatch materials and the like) wherein the raked material is picked up by the machine.

A feature of the present disclosure may include transporting such to and fro over the lawn, overriding and covering areas desired to be thatch, leaf or debris cleared.

These and other features of the power lift rake and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present power lift rake and methods of use thereof will be better understood by reading the Detailed Description of the Preferred and Selected Alternate Embodiments with reference to the accompanying drawing Figures, in which like reference numerals denote similar structure and refer to like elements throughout, and in which:

FIG. 3.1 is a perspective view of the retractable deck with a plurality of tines assembly, according to select embodiments of the instant disclosure;

FIG. 3.2 is a perspective view of a replaceable tine, according to select embodiments of the instant disclosure;

FIG. 4.1 is a rear quarter view of the power lift assembly with retractable deck and plurality of tines in the down/lowered position, according to select embodiments of the instant disclosure;

FIG. 4.2 is a rear quarter view of the power lift assembly with retractable deck and plurality of tines in partially raised position, according to select embodiments of the instant disclosure;

FIG. 4.3 is a rear quarter view of the power lift assembly with retractable deck and plurality of tines in the up/raised position, according to select embodiments of the instant disclosure;

FIG. 5.1 is a rear cutaway view of the power lift assembly, according to select embodiments of the instant disclosure;

FIG. 5.2 is a front top perspective view of the power lift assembly, according to select embodiments of the instant disclosure;

FIG. 6.1 is a rear quarter view of the power lift assembly with retractable deck and plurality of tines in the down/lowered position to rake yard debris, according to select embodiments of the instant disclosure; and FIG. 6.2 is a rear quarter view of the power lift assembly with retractable deck and plurality of tines in partially raised position to deposit yard debris, according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
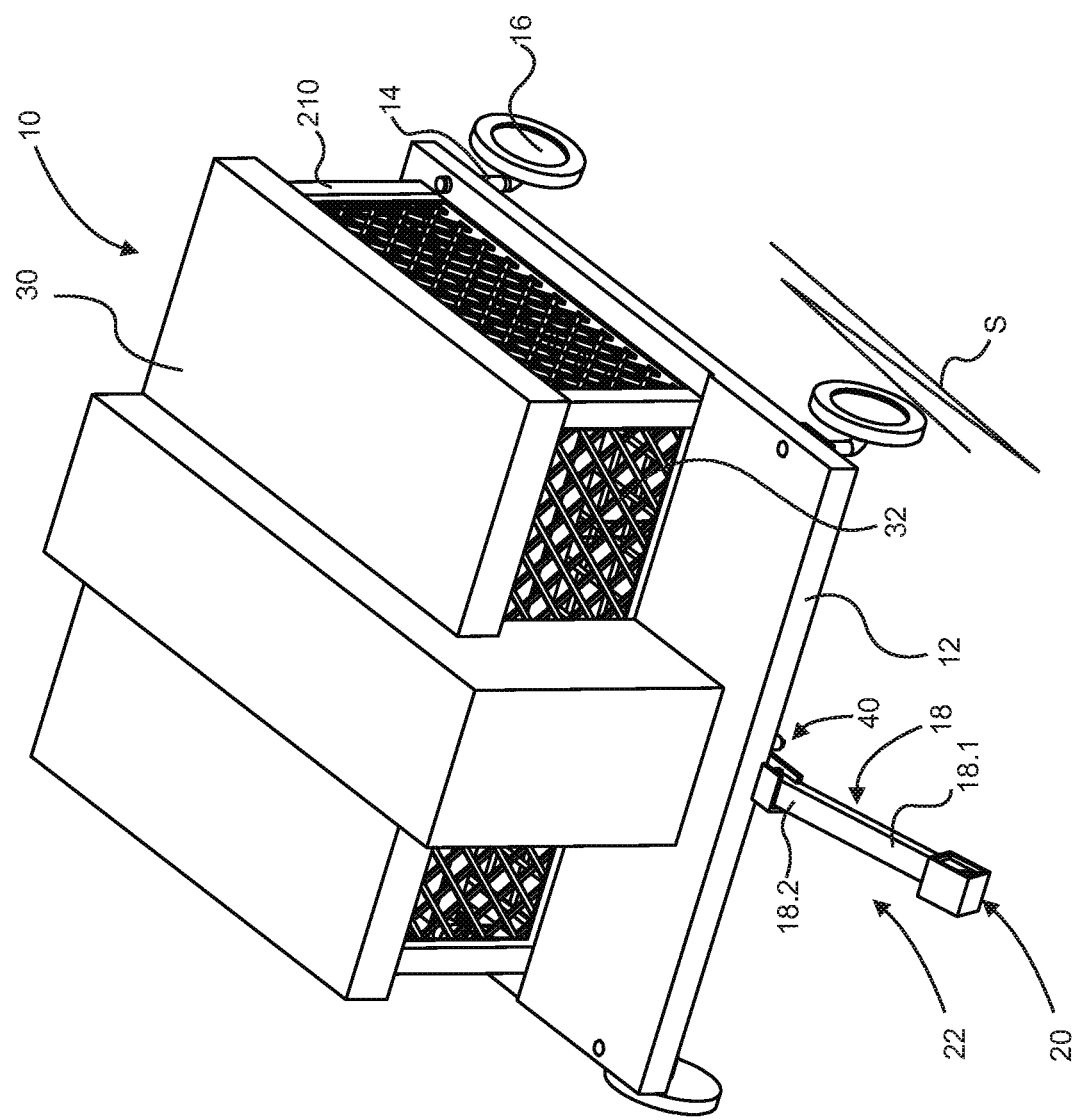
FIG. 1 is a perspective view of the power lift rake assembly according to select embodiments of the instant disclosure.
Figure 2:
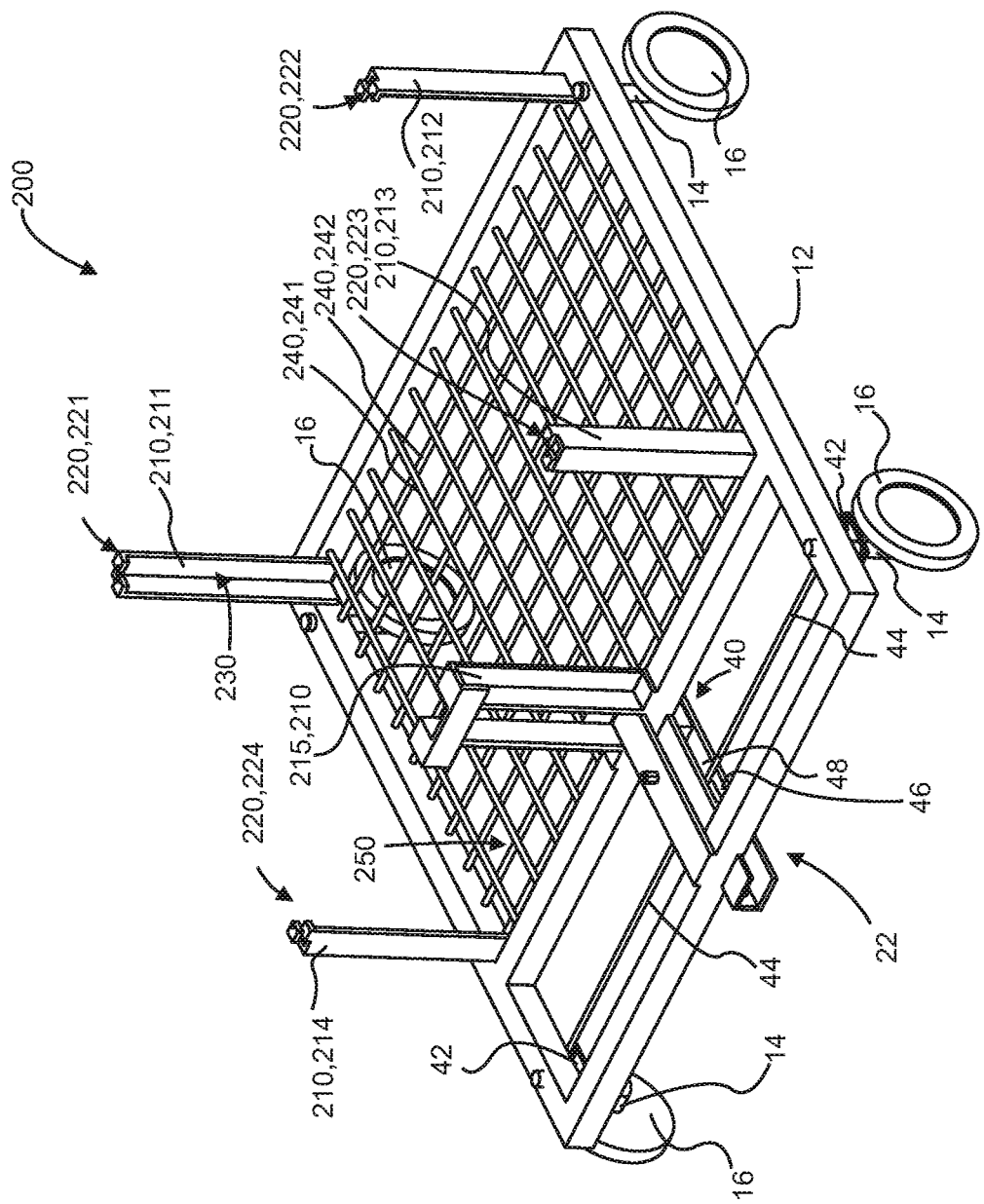
FIG. 2 is a perspective view of the trailer frame, wheels, and screen of the power lift rake assembly, according to select embodiments of the instant disclosure.

In describing the exemplary embodiments of the present disclosure, as illustrated in FIGS. 1, 2, 3.1, 3.2, 4.1, 4.2, 4.3, 5.1, 5.2, 6.1 and 6.2 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIG. 1, by way of example, and not limitation, there is illustrated an example embodiment of power lift rake assembly 10, according to this select embodiment. In this select embodiment, power lift rake assembly 10 may include frame 12 to provide integral structural support for power lift rake assembly 10. Frame 12 herein may be constructed of square tubing (1½ inch) and angle iron (1½ inch) but may be constructed of round tubing, or the like and of different dimensions. This and other materials herein may be constructed of metal, steel, aluminum, alloy, or plastic or more specifically high density polyethylene or similar high tensile or strengthened materials, as these material offers a variety of forms and shapes and provide strength; however, other suitable materials or the like, can be utilized, provided such material has sufficient strength and/or durability as would meet the purpose described herein to enable power lift rake assembly 10 to be drawn, pulled, raised, lowered, or transported across a lawn. Power lift rake assembly 10 may include one or more wheels 16 and preferably four wheels utilized to move or roll power lift rake assembly 10 across surface S, such as a lawn or field. One or more wheels 16 may be supported and connected thereto over connected thereto frame 12 by axle 14. Axle 14 may include elements or parts, such as pins, washers, cotter keys, rotational brackets (front wheels), lock washers, nuts, and the like in order to enable wheel 16 to rotate therearound axle 14 to enable power lift rake assembly 10 to be drawn, pulled or transported across a lawn. Moreover, power lift rake assembly 10 may include a drawbar 18 hingedly connected to frame 12 to draw, pull or transport power lift rake assembly 10 across a lawn. Drawbar 18 may include first drawbar end 18.1 having pin-hitch 20 to hitch power lift rake assembly 10 thereto a motorized vehicle, such as a riding mower, tractor, or other farm or yard power equipment. Pin-hitch 20 may include elements or parts, such as hitch pin, top hitch tongue, bottom hitch tongue and the like in order to enable hitch power lift rake assembly 10 thereto a motorized vehicle. Drawbar 18 may include second drawbar end 18.2 having hinge connector 22 having elements or parts, such as bolts, washers, nuts, clevis and steering mechanism 40 to steer power lift rake assembly 10 across a lawn. Furthermore, power lift rake assembly 10 may include cover 30 to house or encase the internal elements or parts of power lift rake assembly 10. Cover 30 may include a plurality of panels configured to house internal elements or parts of power lift rake assembly 10 and may be constructed of metal diamond plate or other like material.

Referring now to FIG. 2, by way of example, and not limitation, there is illustrated an example embodiment of framed trailer assembly 200. Framed trailer assembly 200 further discloses elements and parts of steering mechanism 40, which may include steering elements or parts, such as bolts, washers, nuts, steering rotating bracket 42, steering clevis 48, clevis pin, pins, yoke, all threaded rod 44, steering rotate plate 48, sleeve, bearings, and the like to enable steering mechanism 24 to steer or make front steerable wheels of power lift rake assembly 10 across a lawn. Moreover, framed trailer assembly 200 may include two or more support columns 210 affixed thereto frame 12 and extending vertically from frame 12. Two or more support columns 210 may be constructed of angle iron (1½ inch) but other material set forth herein are contemplated. Two or more support columns 210 may include first support column 211, second support column 212, third support column 213, and fourth support column 214 positioned proximate thereabout an interior perimeter of frame 12. First support column 211, second support column 212, third support column 213, and fourth support column 214 may each include a two-sided bracket, such as flared brackets 220 affixed to an upper end 215 of each of support columns 210. Flared brackets 220 may include first flared bracket 221, second flared bracket 222, third flared bracket 223, and fourth flared bracket 224 positioned or removeably affixed proximate upper end 215 of first support column 211, second support column 212, third support column 213, and fourth support column 214, respectively, to support an upper frame 12.2. Furthermore, columns 210 may include fifth support column 215, which may be constructed of angle iron (1½ inch×14⅞ inch) or square tubing (1½ inch) and configured as a power plant mount for power lift rake assembly 10. Still furthermore, framed trailer assembly 200 may include welded wire preferably configured with two by four inch 2"×4") spacing, such as separator screen 240 having preferably perpendicularly positioned cross members first direction cross member 241 and opposite or perpendicular second direction cross member. Separator screen 240 may be removeably affixed (bolt, washer, and nut) thereto interior perimeter 230 of frame 12 and configured to provide a plurality of passageways 250 therethrough separator screen 240.

Referring now to FIG. 3.1, by way of example, and not limitation, there is illustrated an example embodiment of retractable deck assembly 300. Retractable deck assembly 300 further discloses elements and parts of deck 310 having upper surface 314 and lower surface 312 and a perimeter edge, such as deck frame 316. Deck frame 316 may include corners, such as frame corners 320. Frame corners 320 may include first frame corner 321, second frame corner 322, third frame corner 323, and fourth frame corner 324 configured to be positioned proximate first support column 211, second support column 212, third support column 213, and fourth support column 214, respectively. Moreover, frame corners 320 may include rollers or other sliding mechanism, such as bumper wheels 330. Bumper wheels 330 may include first bumper wheel 331, second bumper wheel 332, third bumper wheel 333, and fourth bumper wheel 334 configured to be positioned adjacent or proximate first support column 211, second support column 212, third support column 213, and fourth support column 214, respectively. Bumper wheels 330 enable deck 310 to be raised and lowered therein support columns 210, align or maintain deck 310 positioned between support columns 210, and keep deck 310 approximately parallel and aligned thereto separator screen 240. Furthermore, lower surface 312 may include a plurality of tines 340 removeably affixed thereto lower surface 312 of deck 310. Tines 340 may configured in a pattern compatible therewith plurality of passageways 250 therethrough separator screen 240. Moreover, tines 340 may be configured in rows and columns to include for example, first tine 340, 341$x$, second tine 340, 342$x$, third tine 340, 343$x$, fourth tine 340, 344$x$, fifth tine 340, 345$xy$ (corner tine), sixth tine 340, 346$y$, seventh tine 340, 347$y$ configured in a pattern compatible therewith plurality of passageways 250 therethrough separator screen 240. Still furthermore, a raise and lower device, cable, cord, or belt, such as drive chain 360 may be utilized to raise and lower deck 310 having a plurality of tines 340 removeably affixed thereto lower surface 312 therethrough the plurality of passageways 250 therethrough separator screen 240. Drive chain 360 may include for example, first drive chain 361, second drive chain 362, third drive chain 363, fourth drive chain 364. Moreover, each drive chain 360 may be removeably affixed thereto upper surface 314 of deck 310 by chain attachment device 350 and proximate frame corners 320, such as first drive chain 361 proximate first frame corner 321, second drive chain 362 proximate second frame corner 322, third drive chain 363 proximate third frame corner 323, and fourth drive chain 364 proximate fourth frame corner 324, respectively. Chain attachment device 350 may include u-bolts, washers, lock washers, nuts, clamps, dowel, and the like to removeably affix a first drive chain end, such as first drive chain end 361.1, second drive chain end 361.2, third drive chain end 361.3, and fourth drive chain end 361.4 thereto upper surface 314 of deck 310 via chain attachment device 350.

Referring now to FIG. 3.2, by way of example, and not limitation, there is illustrated an example embodiment of tine 340 removeably affixed thereto lower surface 312 of deck 310. Tine 340 may include springe elements, replacement sleeve with screws or parts or wire 370 having some flexibility therefrom lower surface 312 and/or surface S. Tine 340 may be removeably affixed thereto lower surface 312 of deck 310 via attachment mechanism 380, such as square U-channel, striker arm, or flat washer, lock washer, hex head nut, or clip, hole clap, toothed, lock washer, or other like attachment device.

Referring now to FIG. 4.1, by way of example, and not limitation, there is illustrated a quarter example embodiment (other three quarters make up entire assembly) of mechanical movement system to raise and lower retractable deck assembly 300, such as lift assembly 400 (shown in lowered position). Lift assembly 400 may be supported by frame 12.1 affixed to support columns 210 where flared bracket 220 supports upper frame 12.2. Lift assembly 400 may be powered by a drive device, such as motor 410. Motor 410 may be removeably affixed thereto upper frame 12.2 by motor mount plate 412 via carriage bolts or the like, washers, lock washers, and lock nut. Moreover, motor 410 may be directly connected, mechanically coupled, or utilize gear box 414 to rotationally couple motor 410 thereto key stock, such as drive shaft 413 to provide rotational drive. Drive shaft 413 may be rotationally connected centrally thereto upper frame 12.2 by two or more end mounted pillow block 415, one pillow block 415 positioned on each upper frame 12.2, one section of upper frame 12.2 supported between first support columns 211 and second support column 212 and the other section of upper frame 12.2 supported between upper frame 12.2 supported between third support columns 213 and fourth support column 214. Drive shaft 413 may include at least four sprockets 416 (one shown) slidably affixed thereto drive shaft 413 between two or more end mounted pillow block 415. Motor 410 may include power supply, control mechanisms, relays and other electrical components or parts 417 necessary to operate motor 410. Motor 410 may include wireless receiver and transmitter, power on/off, raise, lower or other controls, such as remote controller 418 capable of transmitting and receiving a wireless signal 419, to enable remote operation of power lift rake assembly 10. To provide remote controller 418 capable of remote control of lift assembly 400 via control of the motor 410.

Furthermore, lift assembly 400 may include two additional key stocks (one shown here), such as lift shaft 423. Lift shaft 423 may be rotationally connected thereto upper frame 12.2 by two or more end mounted pillow block 415, one pillow block 415 positioned on each upper frame 12.2, one section of upper frame 12.2 supported between first support columns 211 and second support column 212 and the other section of upper frame 12.2 supported between upper frame 12.2 supported between third support columns 213 and fourth support column 214. Lift shaft 423 may include at least two sprockets 416.2 (one shown) slidably affixed thereto lift shaft 423 between two or more end mounted pillow block 415.

In use as motor 410 rotates R in either direction, gear box 414 rotates R in a similar direction, and drive shaft 413 similarly rotates R in such direction driving at least four sprockets 416 (one shown) to rotate R in such direction. In turn, one of at least four drive sprockets 416.1 connected thereto drive shaft 413 rotates R in such direction similarly pulling second drive chain 362 in direction D1. Second drive chain 362 further extends horizontally thereto and around one of at least two sprockets 416.2 and the traverses vertically down to and may be affixed to upper surface 314 of deck 310 via chain attachment device 350, where second drive chain end 361.2 raises and lowers R/L, retractable deck assembly 300. Raises R retractable deck assembly 300, shown in FIG. 4.2 and fully raised R retractable deck assembly 300 shown in FIG. 4.3. Moreover, the opposite end of second drive chain 362, second drive chain end 362.2 wraps around and underneath one of at least four drive sprockets 416.1 and traverses horizontally under second drive chain 362 and may be affixed thereto a biasing element to take up chain slack, such as slide bar 430. Slide bar 430 may be configured to slide therebetween one section of upper frame 12.2 supported between first support columns 211 and second support column 212 and the other section of upper frame 12.2 supported between upper frame 12.2 supported between third support columns 213 and fourth support column 214 in direction D2. Furthermore, a biasing element, such as coil spring 440 may be connected via first spring end 440.1 thereto spring attachment, such as eye bolt 450 affixed to upper frame 12.2 and second spring end 440.2 may be affixed to slide bar 430. In use, slide bar 430 and coil spring 440 traverses in direction D2, opposite direction D1, to take up the chain slack therein second drive chain 362 to keep the same taught across one of at least two sprockets 416.2 and one of at least four drive sprockets 416.1.

When retractable deck assembly 300 configured to raise and lower R/L, movement, via lift assembly 400, of plurality of tines 340 move therethrough plurality of passageways 250 of separator screen 240 as shown in shown in FIG. 4.2 and fully raised R retractable deck assembly 300 shown in FIG. 4.3.

It is contemplated herein that lift assembly 400 may be configured as a hydraulic device 410 affixed to upper frame 12.2 and retractable deck assembly 300 to raise and lower R/L, movement of plurality of tines 340 therethrough the plurality of passageways 250 of separator screen 240 as shown in shown in FIG. 4.2 and fully raised R retractable deck assembly 300 shown in FIG. 4.3.

Referring now to FIGS. 5.1 and 5.2, by way of example, and not limitation, there is illustrated a half example embodiment (other half makes up entire assembly) of sprocket, chain, and biasing element tensioned mechanical movement system of lift assembly 400 to raise and lower retractable deck assembly 300. Lift assembly 400 may be powered by a drive device, such as motor 410. Motor 410 may be removeably affixed thereto upper frame 12.2 by motor mount plate 412 via carriage bolts or the like, washers, lock washers, and lock nut. Moreover, motor 410 may be directly connected or utilize gear box 414 to rotationally couple motor 410 thereto key stock, such as drive shaft 413. Drive shaft 413 may be rotationally connected thereto upper frame 12.2 by two or more end mounted pillow block 415, one pillow block 415 positioned on each upper frame 12.2, one section of upper frame 12.2 supported between first support columns 211 and second support column 212 and the other section of upper frame 12.2 supported between upper frame 12.2 supported between third support columns 213 and fourth support column 214. Drive shaft 413 may include at least four sprockets 416 (two shown) slidably affixed thereto drive shaft 413 between two or more end mounted pillow block 415. Motor 410 may include power supply, control mechanisms, relays and other electrical components or parts 417 necessary to operate motor 410. Motor 410 may include remote control 512, power on/off, raise, lower or other controls, such as wireless receiver and transmitter 418 capable of transmitting and receiving a wireless signal 419, to enable remote operation of power lift rake assembly 10.

Furthermore, lift assembly 400 may include two additional key stocks (two shown here), such as lift shaft 423A/B. Lift shaft 423A/B may be rotationally connected thereto upper frame 12.2 by two or more end mounted pillow block 415, one pillow block 415 each positioned on each upper frame 12.2, one section of upper frame 12.2 supported between first support columns 211 and other second support column 212 and additional pillow block 415 (not shown) on the other section of upper frame 12.2 supported between upper frame 12.2 supported between third support columns 213 and fourth support column 214. Lift shaft 423 may include at least two sprockets 416.2 (one shown) slidably affixed thereto lift shaft 423 between two or more end mounted pillow block 415.

In use as motor 410 rotates R in either direction, gear box 414 rotates R in a similar direction, and drive shaft 413 similarly rotates R in such direction driving at least four sprockets 416 to rotate R in such direction (two shown). In turn, one of at least four drive sprockets 416.1.*x* (1, 2, 3, 4) connected thereto drive shaft 413 rotates R in such direction similarly pulling second drive chain 362 in direction D1A and first drive chain 362 in direction D1B, opposite of D1A. First drive chain 361 and second drive chain 362 further extends horizontally thereto and around one of at least two sprockets 416.2.*x* (1, 2, 3, 4) and the traverses vertically down to and may be affixed to upper surface 314 of deck 310 via chain attachment device 350, where second drive chain end 361.2 raises and lowers R/L, retractable deck assembly 300. Raises R retractable deck assembly 300, shown in FIG. 4.2 and fully raised R retractable deck assembly 300 shown in FIG. 4.3.

Moreover, the opposite end of second drive chain 362, second drive chain end 362.2 wraps around and underneath one of at least four drive sprockets 416.1.*x* (1, 2, 3, 4) and traverses horizontally under second drive chain 362 and may be affixed thereto slide bar 430. Slide bar 430 may be configured to slide therebetween one section of upper frame 12.2 in slot 514 supported between first support columns 211 and second support column 212 and the other section of upper frame 12.2 supported between upper frame 12.2 supported between third support columns 213 and fourth support column 214 in direction D2. Furthermore, a biasing element, such as coil spring 440A may be connected via first spring end 440A.1 thereto spring attachment, such as eye bolt 450 affixed to upper frame 12.2 and second spring end 440.2 may be affixed to slide bar 430. In use, slide bar 430 and coil spring 440A traverses in direction D2, opposite direction D1A, to take up the chain slack therein second drive chain 362 to keep the same taught across one of at least two sprockets 416.2.1 and one of at least four drive sprockets 416.1.2. Whereas, the opposite end of first drive chain 361, first drive chain end 361.2 wraps around and underneath one of at least four drive sprockets 416.1.1 and traverses horizontally above first drive chain 361 and may be affixed thereto coil spring 440B. Furthermore, a biasing element, such as coil spring 440B may be connected via first spring end 440B.1 thereto spring attachment, such as eye bolt 450 affixed to upper frame 12.2 and second spring end 440B.2 may be affixed to first drive chain end 361.2. In use, coil spring 440B traverses in direction D1B, to take up the chain slack therein first drive chain 361 to keep the same taught across one of at least two sprockets 416.2.2 and one of at least four drive sprockets 416.1.1.

When retractable deck assembly 300 raises and lowers R/L, via lift assembly 400 the plurality of tines 340 move therethrough the plurality of passageways 250 of separator screen 240 as shown in shown in FIG. 4.2 and fully raised R retractable deck assembly 300 shown in FIG. 4.3.

Referring now to FIGS. 6.1 and 6.2, by way of example, and not limitation, there is illustrated a quarter example embodiment (other quarter makes up entire side) of power lift rake assembly 10. Power lift rake assembly 10 may utilize lift assembly 400 to raise or lower R/L retractable deck assembly 300. As shown in FIG. 6.1 lift assembly 400 has lowered L retractable deck assembly 300 until lower limit switch 460, 460.2 is contacted and interrupts or stops lift assembly 400 from lowering L retractable deck assembly 300, wherein plurality of tines 340 move therethrough the plurality of passageways 250 of separator screen 240 as shown in shown in FIG. 6.1 to enable power lift rake assembly 10 to rake yard debris, such as leaves LV and pine straw PS and other debris from yard, lawn, such as ground surface S.

As shown in FIG. 6.2 lift assembly 400 has raised R retractable deck assembly 300 until upper limit switch 460, 460.1 is contacted and interrupts or stops lift assembly 400 from raising R retractable deck assembly 300, wherein plurality of tines 340 move therethrough the plurality of passageways 250 of separator screen 240 as shown in shown in FIG. 6.2 to enable power lift rake assembly 10 to deposit yard debris, such as raked leaves LV and pine straw PS and other debris from ground surface S and transfer yard debris, such as raked leaves LV and pine straw PS to a user determined or select location of ground surface S.

It is contemplated herein that power lift rake assembly 10 with tines 340 down may collect leaves LV and pine straw PS and other debris from ground surface S therein tines 340.

It is further contemplated herein that lift assembly 400 raising R retractable deck assembly 300 causes tines 340 to be pulled therethrough the plurality of passageways 250 of separator screen 240 removing raked leaves LV and pine straw PS therefrom tines 340.

It is still further contemplated herein that power lift rake assembly 10 with tines 340 up may deposit leaves LV and pine straw PS and other debris from one ground surface S location to another ground surface S location.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

It is understood herein that various changes in the material used, shape, size (power lift rake assembly 10), arrangement of parts, and parts are connected with bolts, pins, screws or similar fasteners without departing from the spirit of the scope of the claims herein.

It is further understood herein that the parts and elements of this disclosure may be located or position elsewhere based on one of ordinary skill in the art without deviating from the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A power lift rake assembly to rake and deposit yard debris laying on the ground surface, comprising:
   a retractable deck;
   a plurality of tines extending from an underside of said retractable deck, the tines configured to engage the yard debris on the ground surface;
   a trailer to be moved across the ground surface, said trailer having a frame and wheels;
   a separator screen removeably affixed to an interior of said frame;
   a lift assembly affixed to said frame configured to raise and lower said retractable deck within said frame, wherein said plurality of tines extending from said underside of said retractable deck move therethrough said separator screen, and
   a power system mounted to said frame, said power system configured to drive said lift assembly.

2. The power lift rake assembly of claim 1, further comprising a remote control to operate said power system to raise and lower said retractable deck.

3. The power lift rake assembly of claim 2, wherein said remote control operates via wireless communication.

4. The power lift rake assembly of claim 1, wherein said plurality of tines are configured as spring tensioned tines.

5. The power lift rake assembly of claim 1, wherein said trailer is configured with four of said wheels.

6. The power lift rake assembly of claim 5, wherein two of said wheels further comprising front steerable wheels and a drawbar attached thereto.

7. The power lift rake assembly of claim 6, wherein said drawbar is configured to couple said trailer to a motorized vehicle.

8. The power lift rake assembly of claim 1, wherein said frame further comprising two or more support columns configured to extend vertically and positioned proximate said interior of said frame.

9. The power lift rake assembly of claim 8, wherein said retractable deck further comprising bumper wheels affixed thereto and positioned adjacent each of said two or more support columns to align said plurality of tines therethrough said separator screen.

10. The power lift rake assembly of claim 9, wherein each of said two or more support columns further comprising a flared bracket to support an upper frame.

11. The power lift rake assembly of claim 10, wherein said upper frame supports said lift assembly.

12. The power lift rake assembly of claim 11, wherein said lift assembly further comprising a motor to provide rotational drive thereto a drive shaft centrally positioned on said upper frame.

13. The power lift rake assembly of claim 12, wherein said lift assembly further comprising a remote controller capable of remote control of lift assembly via control of said motor.

14. The power lift rake assembly of claim 12, wherein said lift assembly further comprising a lift shaft positioned proximate an interior of said upper frame, wherein said drive shaft and said lift shaft are configured with sprockets.

15. The power lift rake assembly of claim 14, wherein said lift assembly further comprising a drive chain configured around said sprockets having a first drive chain end removeably affixed to said retractable deck and a second drive chain end removeably affixed to a biasing element, said biasing element affixed to said upper frame, to take up a chain slack.

16. The power lift rake assembly of claim 15, wherein said motor mechanically coupled to said drive shaft, drives said sprocket to move said drive chain, to rotate said sprocket on said lift shaft, raise or lower said first drive chain end connected to said retractable deck to raise or lower said plurality of tines therethrough said separator screen.

17. The power lift rake assembly of claim 16, wherein said retractable deck is in a lowered position with said plurality of tines lowered through said separator screen to rake and collect the yard debris from the ground surface.

18. The power lift rake assembly of claim 16, wherein said retractable deck is in a raised position with said plurality of tines raised up through said separator screen to deposit the yard debris in a select location of the ground surface.

19. The power lift rake assembly of claim 11, wherein said lift assembly further comprising a hydraulic device affixed to said upper frame and said retractable deck configured to provide raise and lower movement of said retractable deck.

20. A power lift rake assembly to rake and deposit yard debris laying on the ground surface, comprising:
   a retractable deck;
   a plurality of tines extending from an underside of said retractable deck, the tines configured to engage the yard debris on the ground surface;
   a frame to be moved across the ground surface;
   a screen removeably affixed to an interior of said frame;
   a lift assembly affixed to the frame configured to raise and lower said retractable deck within said frame, wherein said plurality of tines extending from said underside of said retractable deck move therethrough said screen.

* * * * *